US012109638B2

(12) United States Patent
Ogawa et al.

(10) Patent No.: US 12,109,638 B2
(45) Date of Patent: Oct. 8, 2024

(54) CUTTING INSERT AND GEAR CUTTER (71) Applicant: TUNGALOY CORPORATION, Fukushima (JP)

(72) Inventors: Atsushi Ogawa, Iwaki (JP); Akimichi Suzuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 540 days.

(21) Appl. No.: 17/465,227

(22) Filed: Sep. 2, 2021

(65) Prior Publication Data
US 2022/0143721 A1 May 12, 2022

(30) Foreign Application Priority Data

Nov. 11, 2020 (JP) .................................. 2020-188022

(51) Int. Cl.
*B23F 21/12* (2006.01)
(52) U.S. Cl.
CPC .................................. *B23F 21/128* (2013.01)
(58) Field of Classification Search
CPC ...... B23F 21/128; B23F 21/126; B23F 21/12; B23C 2200/367; B23C 2200/203; B23C 5/202
See application file for complete search history.

(56) References Cited

U.S. PATENT DOCUMENTS

2016/0059333 A1* 3/2016 Thornqvist ........... B23C 5/2213
407/29

FOREIGN PATENT DOCUMENTS

| JP | H09-117824 A | 5/1997 |
| JP | 2013-233648 A | 11/2013 |

* cited by examiner

*Primary Examiner* — Alan Snyder
(74) *Attorney, Agent, or Firm* — Studebaker & Brackett PC (57) ABSTRACT

A cutting insert which is excellent both in manufacturing performances and dimensional precision and forms a pair with a tool body and a gear cutter including the cutting insert are provided. A cutting insert has a first face which is a rake face, a second face, a peripheral side face, and a mounting hole. On a ridge line where the first face and the peripheral side face cross each other, a cutting blade is formed. The cutting blade includes a corner part capable of machining a tooth bottom of a gear, and a main part extending to the corner part. The peripheral side face includes an inner side face in contact with a tool body and a first flank facing the main part. The mounting hole penetrates the first flank and the inner side face so that a center axis crosses the inner side face perpendicularly. The cutting insert is formed having a wedge shape such that thickness of the first flank and the inner side face becomes smaller as it goes from one end to the other end.

19 Claims, 6 Drawing Sheets

FIG. 6

CUTTING INSERT AND GEAR CUTTER

CROSS-REFERENCES TO RELATED APPLICATIONS

This application relates to and claims priority from Japanese Patent Application No. 2020-188022, filed on Nov. 11, 2020, the entire disclosure of which is incorporated herein by reference.

BACKGROUND

Field

The present invention relates to a cutting insert and a gear cutter including the cutting insert.

Description of Related Art

There is known a gear cutter (Gear cutter) called a hob (Gear Hob). The hob has a substantially cylindrical shape, and a spiral protruding strip part having a cutting blade is formed on an outer peripheral face thereof. For example, Patent Publication JP-A-H09-117824 discloses a throwaway-chip direct-mounting type hob in which a replaceable throwaway chip is fixed to a tool body. In the flat-plate shaped throwaway chip disclosed in Patent Publication JP-A-H09-117824, as referred to in FIG. 3 in Patent Publication JP-A-H09-117824, the protruding strip part of an adjacent mountain (a "worm" in Patent Publication JP-A-H09-117824) overlaps an extension of a center axis of a screw hole in which the throwaway chip is fixed.

Figure 6:
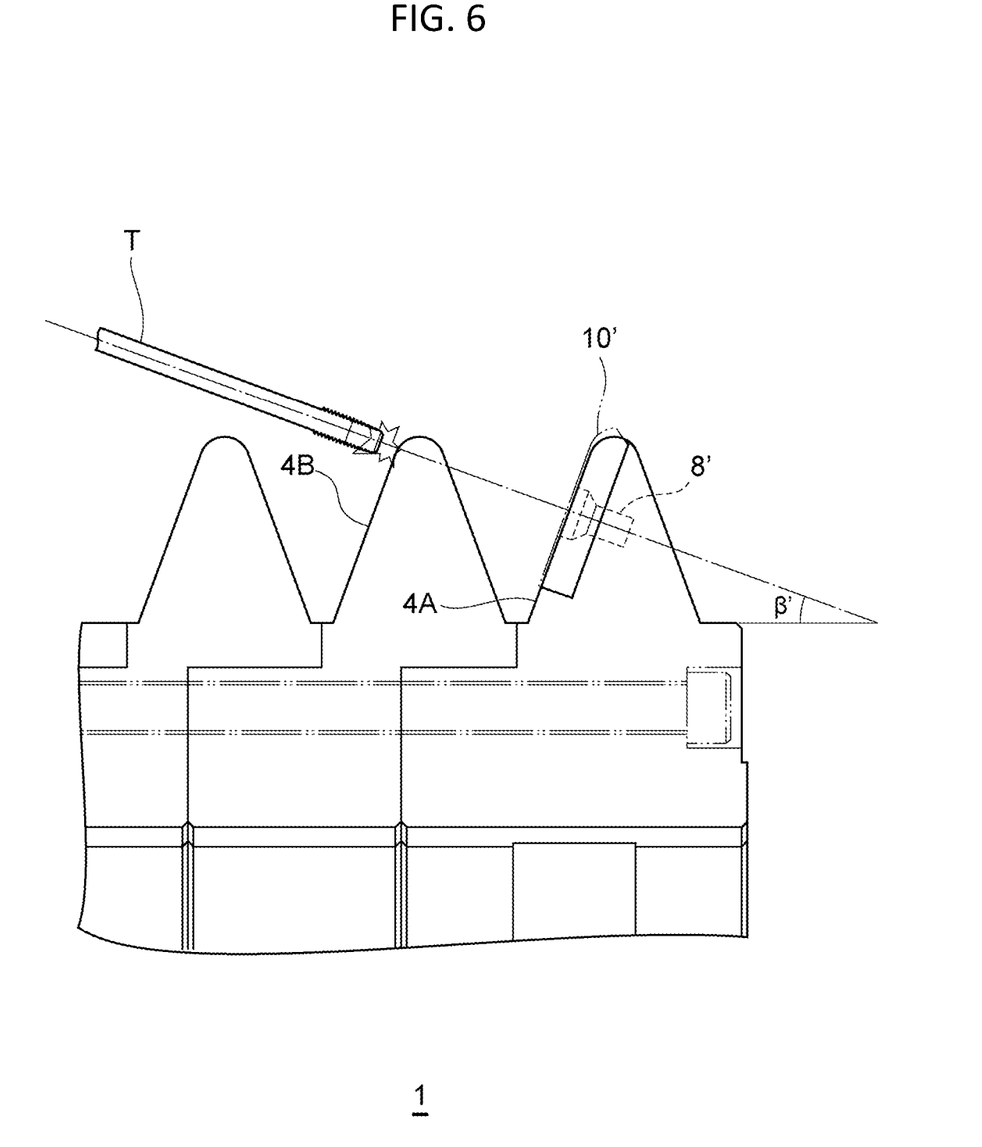
FIG. 6 is a sectional view when the screw hole is to be formed in a tool body which forms a pair with a conventional cutting insert.

In such a positional relationship, as referred to in FIG. 6 in the present application, when a screw hole is formed in the protruding strip part so as to manufacture the tool body, a tap for tapping, a drill for a prepared hole or the like interferes with the projecting strip part on the adjacent mountain in parallel with the projecting strip part in which the screw hole is to be formed, and it is difficult to manufacture the tool body which forms a pair with the throwaway chip. In order to avoid interference with the tap, a cut called a cutting pocket is made in the protruding strip part in the adjacent mountain in Patent Publication JP-A-H09-117824. Since the throwaway chip cannot be disposed at a portion of the cutting pocket, it increases limitation in design.

In order to solve these problems, Patent Publication JP-A-2013-233648 discloses a milling tool in which a plurality of protruding strips ("segment" in Patent Publication JP-A-2013-233648) are constituted, capable of being divided into one wind each, and constituting the tool body by connecting the plurality of protruding strips to each other, for example. When the tool body is manufactured by forming a screw hole in the protruding strip part or when a screw is pulled off the screw hole so that a milling insert is replaced, those operations can be performed in a state where the protruding strip part is removed in Patent Publication JP-A-2013-233648.

SUMMARY

On the other hand, with Patent Publication JP-A-2013-233648, since it is an assembling type, machining errors of the plurality of protruding strip parts are accumulated on the tool body. Strict dimensional accuracy is required for each of the protruding strip parts. The solution of Patent Publication JP-A-2013-233648 involves a bad effect of a rise in a manufacturing cost of the tool body. In view of such circumstances, the present invention has an object to provide a cutting insert which is excellent both in manufacturing performances and dimensional accuracy and forms a pair with the tool body and a gear cutter including the cutting insert.

A cutting insert according to an aspect of the present invention is a replaceable cutting insert fixed to a tool body and constituting a gear cutter. The cutting insert has a first face which is a rake face, a second face on a side opposite to the first face, a peripheral sided face connecting the first face and the second face, and a mounting hole provided in the peripheral side face. A cutting blade is formed on a ridge line where the first face and the peripheral side face cross each other. The cutting blade includes a corner part including one end of the cutting blade and capable of machining of a tooth bottom of a gear, and a main part extending to the corner part from the other end of the cutting blade located on the side opposite to the one end. The peripheral side face includes an outer side face facing the cutting blade and an inner side face on a side opposite to the outer side face and in contact with the tool body. The outer side surface further includes a first flank facing the main part. The mounting hole penetrates the first flank and the inner side face so that a center axis of the mounting hole crosses the inner side face perpendicularly. The cutting insert is formed having a wedge shape such that thickness of the first flank and the inner side face becomes smaller as it goes from the one end to the other end.

A gear cutter according to another aspect of the present invention is a gear cutter capable of creating a tooth profile of a gear. The gear cutter includes a replaceable cutting insert and a tool body in which an insert mounting seat to which the cutting insert is fixed is provided. The insert mounting seat has a seating face in which a screw hole is formed perpendicularly. The insert mounting seat is formed such that a step from an outer edge of the insert mounting seat to the seated face becomes deeper as it goes away from a rotation axis of the tool body.

According to these aspects, the seating face of the insert mounting seat of the tool body which forms a pair with the cutting insert is formed having a wedge shape in which a depth becomes smaller from a distal end to a base end of the protruding strip part. Since an elevation angle of the center axis of the screw hole perpendicular to the seating face of the insert mounting seat becomes larger, when the screw hole is formed in the protruding strip part so as to manufacture the tool body, as referred to in FIG. 5 of the present application, a tap for tapping, a drill for a prepared hole or the like does not interfere with the protruding strip part on the adjacent mountain in parallel with the protruding strip part in which the screw hole is to be formed. Since the tapping can be performed without using an assembling type, manufacturing performances of the tool body is excellent. Since machining errors are not accumulated, dimensional accuracy is excellent.

In the above aspects, an angle formed by an extending direction of the main part and a virtual face formed by extending the inner side face may be 1 degree or more and 45 degrees or less.

According to this aspect, the elevation angle of the center axis of the screw hole can be increased only by the angle formed by the extending direction of the main part and the virtual face formed by extending the inner side face.

In the above aspect, the mounting hole may overlap the virtual face dividing a height of the cutting blade in a radial direction of the tool body into halves.

If the tap for tapping, the drill for a prepared hole or the like does not interfere with the protruding strip part on the adjacent mountain in parallel with the protruding strip part in which the screw hole is to be formed, there is no need to shift the position of the screw hole closer to the distal end of the protruding strip part with which the tap or the like hardly interferes. According to this aspect, the cutting insert can be fixed reliably with a good balance by forming the mounting hole at a center part in the cutting insert.

In the above aspect, the first face and the second face are formed mirror symmetrically when viewed from the mounting hole, and a second cutting blade may be formed on a ridge line where the second face and the peripheral side face cross each other.

According to this aspect, one of right and left tooth faces of the tooth profile of a gear is machined by the cutting blade on the first face side, while the other tooth face is machined by the cutting blade on the second face side so that the tooth faces on the both right and left faces of the tooth profile of the gear can be formed by the cutting insert having the same shape. Since there is no need to prepare two types of the cutting inserts, a burden of inventory management of consumables can be reduced. Since two cutting blades can be used twice for the same cutting insert, economy is excellent.

According to the present invention, the cutting insert which is excellent both in manufacturing performances and dimensional accuracy and forms a pair with the tool body and the gear cutter including the cutting insert can be provided.

DETAILED DESCRIPTION

By referring to the attached drawings, a preferred embodiment of the present invention will be described. In each of the drawings, those given the same reference numerals have the same or similar structures. A gear cutter 1 according to an embodiment of the present invention is a cutting-edge replacement type hob and a gear cutter similar to that, and by mounting it on a hobbing machine and rotating it, a tooth profile of a gear or the like can be cut on an outer peripheral face of a work rotated synchronously by a generating method.

Figure 1:
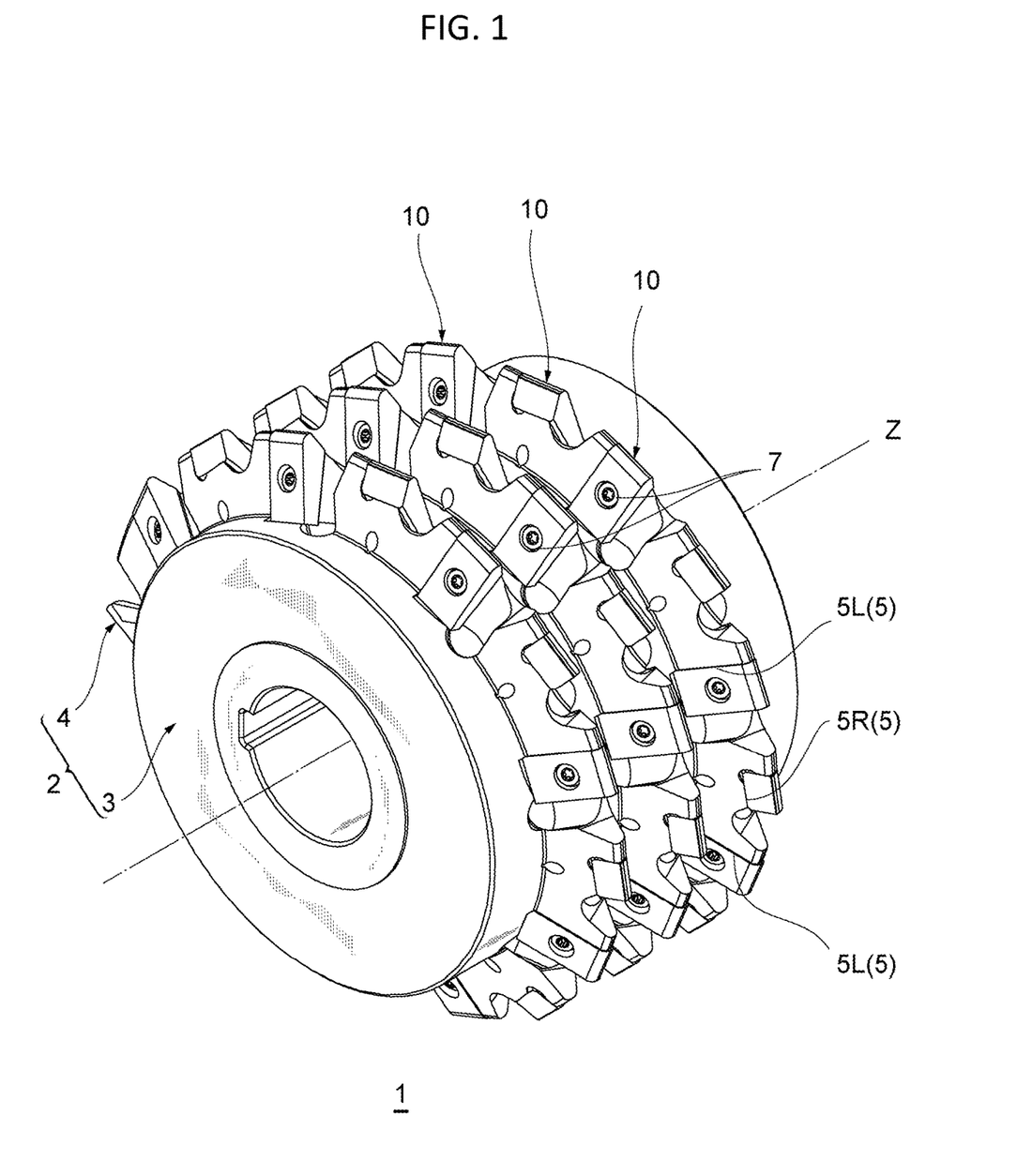
FIG. 1 is a perspective view illustrating an example of a gear cutter according to an embodiment of the present invention.

FIG. 1 is a perspective view illustrating an example of the gear cutter 1 according to an embodiment of the present invention. As illustrated in FIG. 1, the gear cutter 1 includes a plurality of replaceable cutting inserts 10 and a tool body 2 fixing the cutting inserts 10. The tool body 2 has a cylindrical part 3 formed having a substantially cylindrical shape, a protruding strip part 4 provided spirally on an outer peripheral face of the cylindrical part 3. A cross section of the protruding strip part 4 is formed having a substantially trapezoidal shape corresponding to a pressure angle or a module of the tooth profile to be created on the gear cutter 1.

Figure 2:
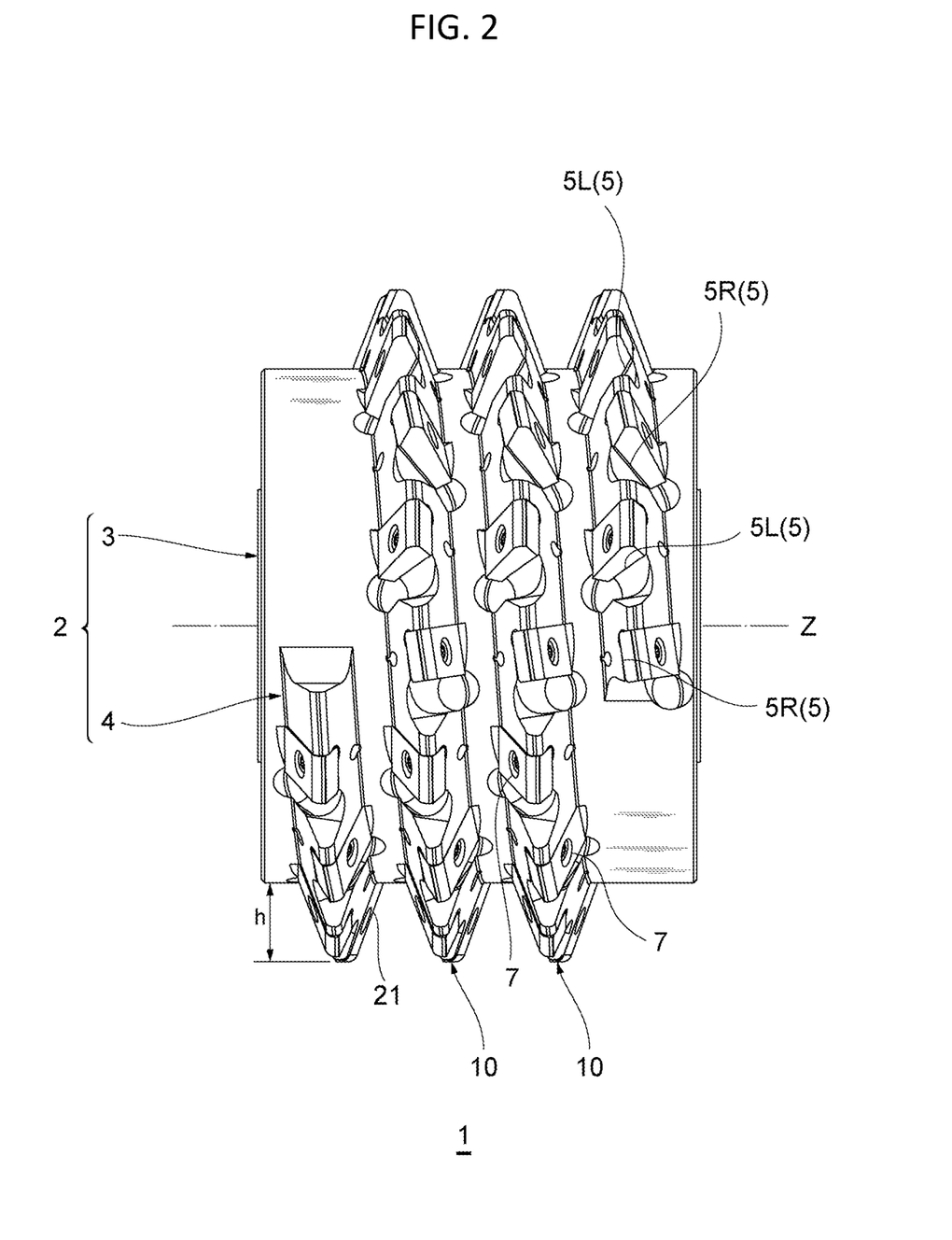
FIG. 2 is a side view of the gear cutter illustrated in FIG. 1 when viewed from a radial direction.

FIG. 2 is a side view of the gear cutter illustrated in FIG. 1 when viewed from a radial direction orthogonal to a rotation axis Z. As illustrated in FIG. 2, a plurality of insert mounting seats 5 are provided substantially at equal intervals on the protruding strip part 4. In the illustrated example, the insert mounting seats 5 are provided alternately on one side and the other side of the protruding strip part 4. The cutting inserts 10 fixed to the tool body 2 are arrayed in a staggered manner.

In the following explanation, the insert mounting seat 5 provided on either one of the sides of the protruding strip part 4 is called a first insert mounting seat 5L, while the insert mounting seat 5 provided on the other side is called a second insert mounting seat 5R in some cases. To each of the insert mounting seats 5, the cutting insert 10 is fixed one each by a screw (male screw) 7.

Figure 3:
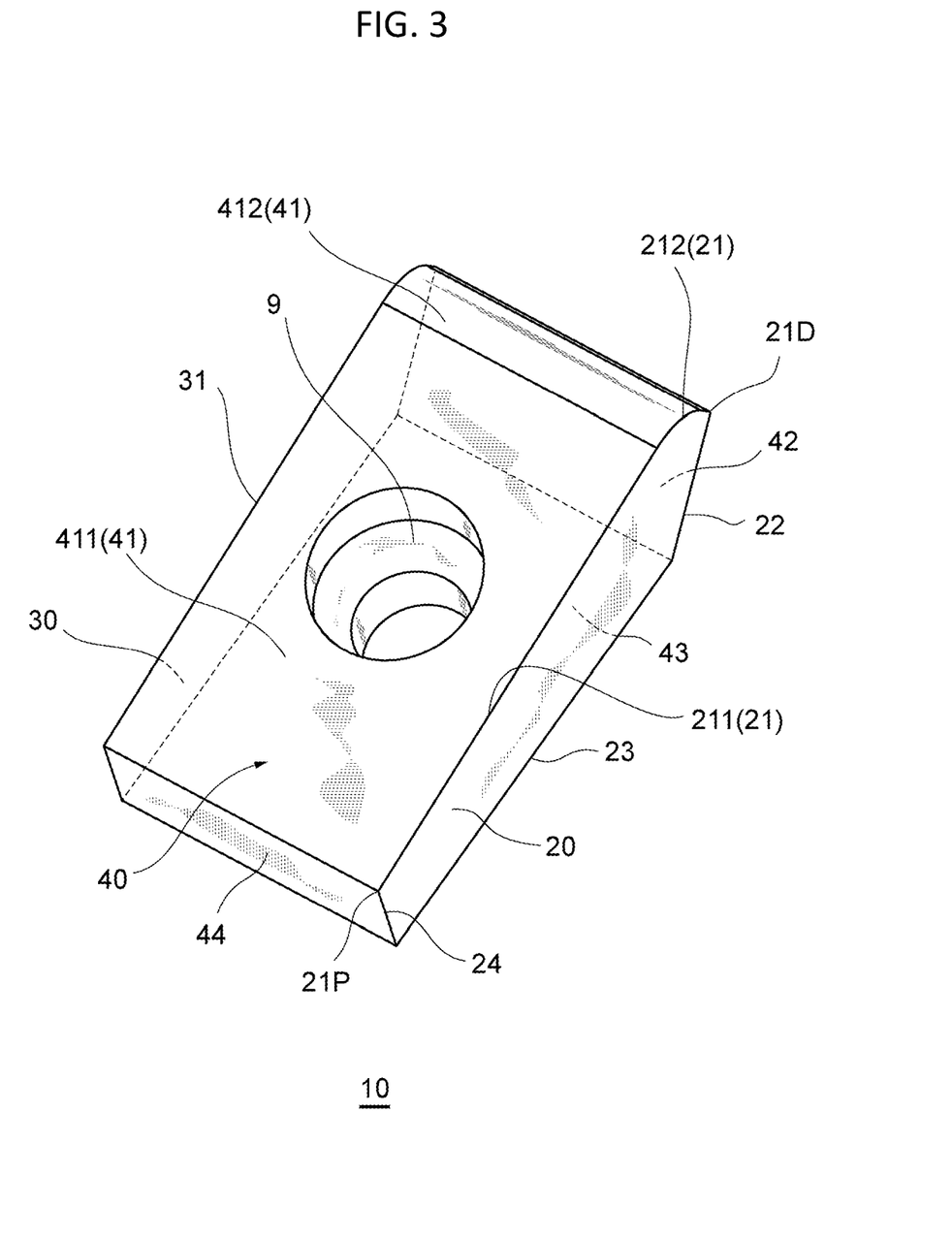
FIG. 3 is a perspective view illustrating an example of a cutting insert of an embodiment of the present invention.

FIG. 3 is a perspective view illustrating an example of the cutting insert 10 of the embodiment of the present invention. As illustrated in FIG. 3, the cutting insert 10 has a first face 20, a second face 30 on a side opposite to the first face 20, a peripheral side face 40 connecting the first face 20 and the second face 30, and a mounting hole 9 provided in the peripheral side face 40.

Ridge lines (21, 22, 23, 24) where the first face 20 which is the rake face and the peripheral side face 40 cross each other include a first side 21 which is a cutting blade, a third side 23 on a side opposite to the first side 21, a second side 22 connecting one end 21D of the first side 21 and one end of the third side 23, and a fourth side 24 connecting the other end 21P of the first side 21 and the other end of the third side 23. In the following explanation, the first side 21 is called a cutting blade 21 in some cases.

In a state where the cutting insert 10 is fixed to the tool body 2, the one end 21D of the cutting blade 21 is disposed on a distal end side of the protruding strip part 4. The other end 21P on the side opposite to the one end 21D is disposed on a base end side of the protruding strip part 4. The cutting blade 21 includes a corner part 212 including the one end 21D and a portion in the vicinity thereof, and a main part 211 extending from the other end 21P on the side opposite to the one end 21D to the corner part 211.

The corner part 212 is a part for cutting and working the tooth bottom of the gear in the cutting blade 21 and is curved into a V-shape in accordance with the tooth profile of the gear. The main part 211 is a part for working the tooth face of the gear in the cutting blade 21 and is formed linearly in the illustrated example. The main part 211 may be curved gently.

In the illustrated example, the first face 20 and the second face 30 are formed mirror symmetrically when viewed from the mounting hole 9. The second face 30 is constituted as a second rake face. On the ridge lines (31, 32, 33, 34) where the second face 30 and the peripheral side face 40 cross each other, a cutting blade 31 is formed. The second cutting blade 31 has the shape and function similar to those of the aforementioned cutting blade 21.

The peripheral side face 40 includes an outer side face 41 facing the cutting blade (first side) 21, a distal end face 42 facing the second side 22, an inner side face 43 facing the third side 23, and a base end face 44 facing the fourth side 24. The outer side face 41 is a flank of the cutting blade 21. In a state where the cutting insert 10 is fixed to the tool body 2, the inner side face 43 is brought into contact with the protruding strip part 4. The distal end face 42 is disposed on the distal end side of the protruding strip part 4. The base end face 44 is disposed on the base end side of the protruding strip part 4.

The outer side face 41 further includes a first flank 411 facing the main part 211 of the cutting blade 21 and a second flank 412 facing the corner part 212. In the illustrated example, the first flank 411 is formed as a plane, and the second flank 412 is formed as a curved face. The mounting hole 9 into which a screw 7 (illustrated in FIG. 1) is inserted penetrates the first flank 411 of the outer side face 41 and the inner side face 43. That is, the cutting insert 10 is constituted as a vertical insert such that the mounting hole 9 penetrates not through the first face 20 which is the rake face but through the peripheral side face 40. In the illustrated example, the mounting hole 9 is formed so as to penetrate the center part of the outer side face 41.

Figure 4:
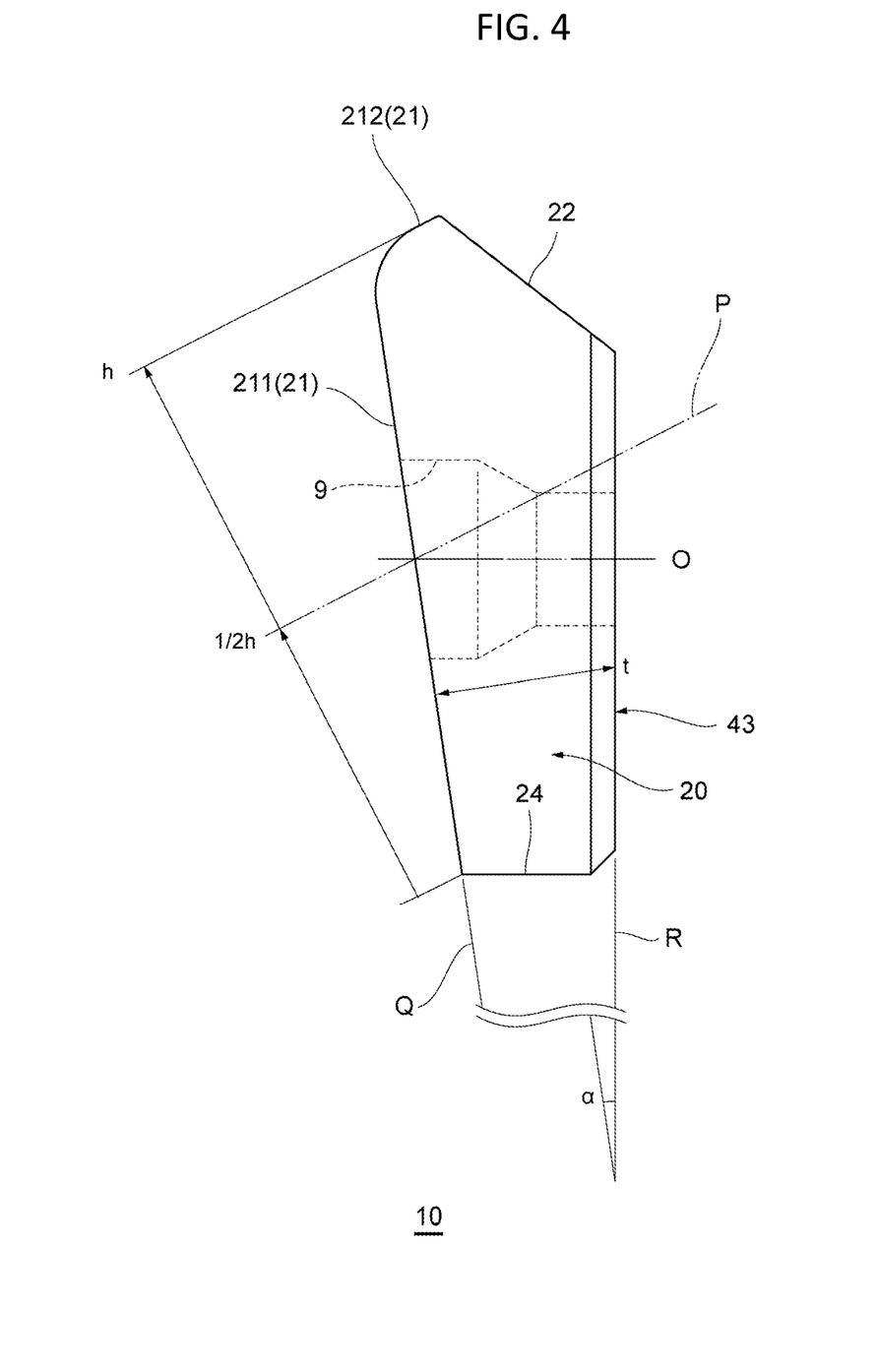
FIG. 4 is a plan view of the cutting insert illustrated in FIG. 3 when viewed from a rake face side.

FIG. 4 is a plan view of the cutting insert 10 illustrated in FIG. 3 viewed from the first face 20 side. As illustrated in FIG. 4, the mounting hole 9 is formed so that a center axis O of the mounting hole 9 crosses the inner side face 43 perpendicularly. The mounting hole 9 overlaps a virtual face P dividing a height h of the cutting blade 21 in a radial direction of the tool body 2 into halves in a state where the cutting insert 10 is fixed to the tool body 2 (see FIG. 2).

The cutting insert 10 is formed having a wedge shape in which a thickness t from the first flank 411 to the inner side face 43 becomes smaller as it goes from the one end 21D of the cutting blade 21 toward the other end 21P. An angle α formed by an extending direction Q of the main part (linear part) 211 of the cutting blade 21 and a virtual face R formed by extending the inner side face 43 is 1 degree or more and 35 degrees or less, for example. The angle α can be changed as appropriate in accordance with a pressure angle of the tooth profile created on the gear cutter 1, and an elevation angle β of a center axis of a screw hole (female screw) 8 which will be described later can be increased by the angle α. In the illustrated example, it is constituted that the pressure angle is 20 degrees, and the angle α is 8.5 degrees.

When the main part 211 is curved, the extending direction Q of the main part 211 is an extending direction of a straight line passing through the both ends of the main part 211, for example. A boundary between the main part 211 which is one end of the main part 211 and the corner part 212 is a position where a curvature of the main part 211 changes to the curvature of the corner part 212, for example.

Figure 5:
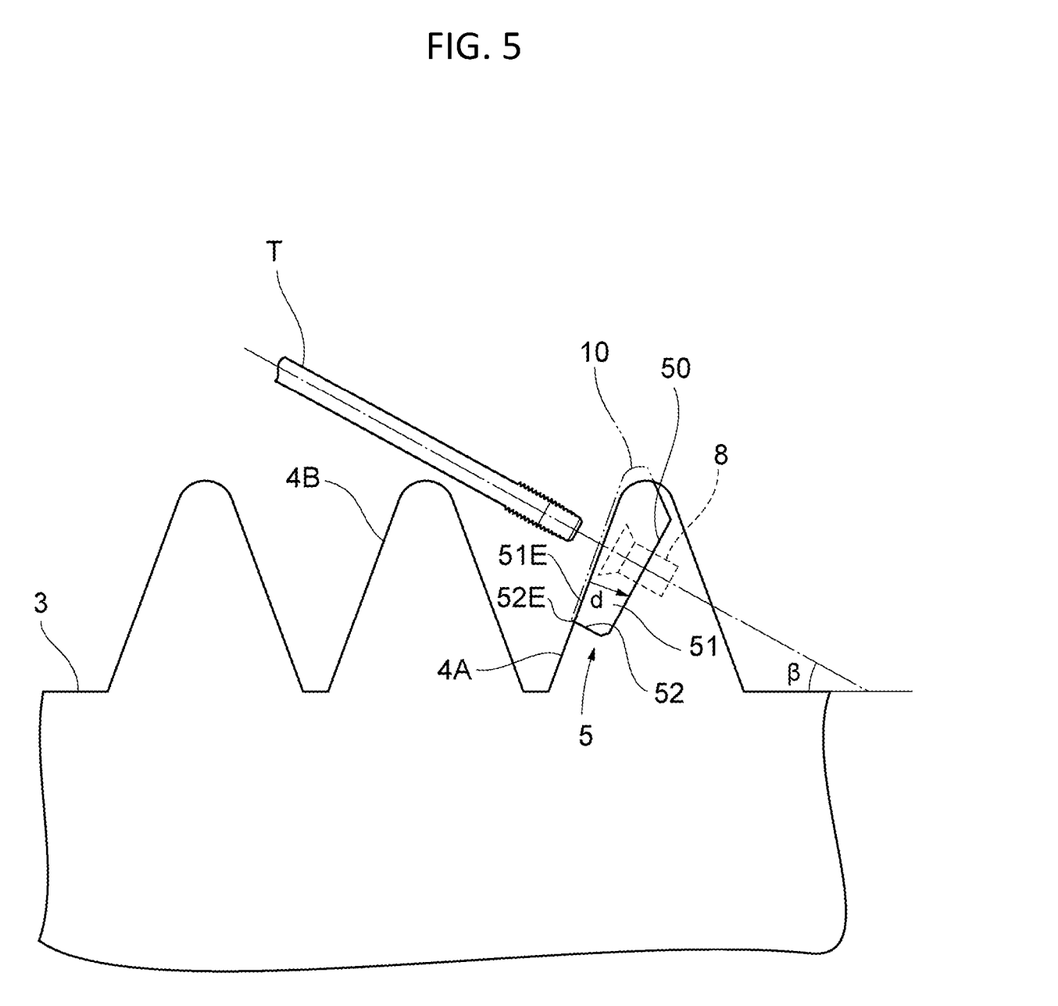
FIG. 5 is a sectional view when a screw hole is to be formed in a tool body which forms a pair with the cutting insert of the present invention.

FIG. 5 is a sectional view when the screw hole 8 is formed in the tool body 2 which forms a pair with the cutting insert 10 of the present invention. The insert mounting seat 5 described above has a seating face 50, a first restriction wall 51, and a second restriction wall 52. The seating face 50 is brought into contact with the inner side face 43 of the cutting insert 10. In the seating face 50, the screw hole 8 is formed. The center axis of the screw hole 8 crosses the seating face 50 perpendicularly. The first restriction wall 51 is brought into contact with the second face 30. The second restriction wall 52 is brought into contract with the base end face 44. The insert mounting seat 5 is brought into contact with the cutting insert 10 from three directions and reliably restricts it.

The insert mounting seat 5 is formed so that a step d from outer edges 51E and 52E of the insert mounting seat 5 to the seating face 5 becomes deeper as it is separated from the rotation axis Z of the tool body 2 (illustrated in FIG. 2). The insert mounting seat 5 as above can be worked from the radial direction of the tool body 2 by using an end mill or the like. One example of the outer edge 51E is an open end on a side opposite to the seating face 50 in the first restriction wall 51, and one example of the outer edge 52E is an open end on a side opposite to the seating face 50 in the second restriction wall 52.

According to the cutting insert 10 and the gear cutter 1 including the cutting insert 10 of the present embodiment constituted as above, the elevation angle β of the center axis of the screw hole 8 (illustrated in FIG. 5) perpendicular to the seating face 50 of the insert mounting seat 5 becomes larger by the wedge angle α (illustrated in FIG. 4).

FIG. 6 is a view illustrating comparison with FIG. 5 and is a sectional view when a screw hole 8' is formed in a tool body 2' which forms a pair with a conventional cutting insert 10'. The cutting insert 10' with the conventional shape was formed in a flat planar state, not in a wedge state. With such cutting insert 10', the elevation angle β' of the center axis of the screw hole 8' of the tool body 2' forming a pair with the cutting insert 10' is small. When the tool body 2 is manufactured by forming the screw hole 8 in the protruding strip part 4, a tap T for tapping or the like interferes with a protruding strip part 4B on the adjacent mountain in parallel with a protruding strip part 4A in which the screw hole 8' is to be formed and thus, it was difficult to manufacture the tool body 2 without dividing it.

On the other hand, in the present embodiment, since the elevation angle β of the center axis of the screw hole 8 is sufficiently large, as illustrated in FIG. 5, when the tool body 2 is to be manufactured by forming the screw hole 8 in the protruding strip part 4A, the tap T for tapping or the like does not interfere with the protruding strip part 4B on the adjacent mountain. Since the screw hole 8 can be tapped without using the assembling type, manufacturing performances of the tool body 2 are excellent. Since the working errors are not accumulated, dimensional accuracy of the tool body 2 is excellent. Since there is no need to shift the position of the screw hole 8 closer to the distal end of the protruding strip part 4 where the tap T or the like does not interfere easily, as illustrated in FIG. 3, the mounting hole 9 is formed at the center part of the outer side face 41 of the cutting insert 10, and the cutting insert 10 can be reliably fixed to the insert mounting seat 5 with a good balance.

Moreover, the cutting insert 10 of the present embodiment has, as illustrated in FIG. 3, two rake faces, that is, the first face 20 and the second face 30, and they are formed mirror symmetrically. As illustrated in FIG. 1, one of the tooth faces of the gear can be worked by the cutting blade 21 of the cutting insert 10 fixed to the first insert mounting seat 5L of the tool body 2. The other tooth face on the side opposite to the one tooth face can be worked by the cutting blade 31 of the cutting insert 10 fixed to the second insert mounting seat 5R of the tool body 2. The tooth faces on the both right and left tooth faces of the tooth profile of the gear can be formed by the cutting insert 10 with the same shape. Since there is no need to prepare two types of the cutting inserts 10, the burden of inventory management of consumables can be reduced. Since the two cutting blades 21 and 31 can be used twice for the same cutting insert 10, economy is excellent.

The embodiment described above is for facilitating understanding of the present invention and is not for interpreting the present invention in a limited manner. Each of the elements included in the embodiment, the disposition, materials, conditions, shapes, sizes, and the like thereof are not limited to those exemplified but can be changed as appropriate. Moreover, the constitutions illustrated in different embodiments can be partially replaced or combined.

What is claimed is:

1. A cutting insert which is a replaceable cutting insert fixed to a tool body and constituting a gear cutter, the cutting insert comprising:
a first face which is a rake face, a second face on a side opposite to the first face, a peripheral side face connecting the first face and the second face, and a mounting hole provided in the peripheral side face, wherein
a cutting blade is formed on a ridge line where the first face and the peripheral side face cross each other,
the cutting blade includes a corner part that includes one end of the cutting blade and that is capable of machining a tooth bottom of a gear, and a main part extending to the corner part from the other end of the cutting blade on the side opposite to the one end,
the peripheral side face includes an outer side face facing the cutting blade and an inner side face on a side opposite to the outer side face and in contact with the tool body, the outer side face further including a first flank facing the main part,
the mounting hole penetrates the first flank and the inner side face so that a center axis of the mounting hole crosses the inner side face perpendicularly, and
the cutting insert is formed having a wedge shape such that a thickness between the first flank and the inner side face continuously decreases along an entirety of the main part towards the other end.

2. The cutting insert according to claim 1, wherein an angle formed by an extending direction of the main part and a virtual face formed by extending the inner side face is 1 degree or more and 45 degrees or less.

3. The cutting insert according to claim 2, wherein the mounting hole is superimposed on the virtual face bisecting a height of the cutting blade in a radial direction of the tool body.

4. The cutting insert according to claim 3, wherein
the first face and the second face are formed mirror symmetrically when viewed from the mounting hole, and
on a ridge line where the second face and the peripheral side face cross each other, a second cutting blade is formed.

5. The cutting insert according to claim 3, wherein the inner side face is planar.

6. The cutting insert according to claim 3, wherein the main part is a straight line.

7. The cutting insert according to claim 2, wherein
the first face and the second face are formed mirror symmetrically when viewed from the mounting hole, and
on a ridge line where the second face and the peripheral side face cross each other, a second cutting blade is formed.

8. The cutting insert according to claim 2, wherein the inner side face is planar.

9. The cutting insert according to claim 2, wherein the main part is a straight line.

10. The cutting insert according to claim 1, wherein the mounting hole is superimposed on a virtual face bisecting a height of the cutting blade in a radial direction of the tool body.

11. The cutting insert according to claim 10, wherein
the first face and the second face are formed mirror symmetrically when viewed from the mounting hole, and
on a ridge line where the second face and the peripheral side face cross each other, a second cutting blade is formed.

12. The cutting insert according to claim 10, wherein the inner side face is planar.

13. The cutting insert according to claim 10, wherein the main part is a straight line.

14. The cutting insert according to claim 1, wherein
the first face and the second face are formed mirror symmetrically when viewed from the mounting hole, and
on a ridge line where the second face and the peripheral side face cross each other, a second cutting blade is formed.

15. The cutting insert according to claim 14, wherein the inner side face is planar.

16. The cutting insert according to claim 14, wherein the main part is a straight line.

17. The cutting insert according to claim 1, wherein the inner side face is planar.

18. The cutting insert according to claim 1, wherein the main part is a straight line.

19. A gear cutter which can create a tooth profile of a gear, the gear cutter comprising:
the replaceable cutting insert according to claim 1; and
a tool body in which an insert mounting seat to which the cutting insert is fixed is provided, wherein
the insert mounting seat has a seating face in which a screw hole is formed perpendicularly, and
the insert mounting seat is formed such that a step from an outer edge of the insert mounting seat to the seating face becomes deeper going away from a rotation axis of the tool body.

* * * * *